(12) United States Patent
Mongkolsmai et al.

(10) Patent No.: US 7,703,094 B2
(45) Date of Patent: Apr. 20, 2010

(54) ADAPTIVE AND DYNAMIC FILTERING OF THREADED PROGRAMS

(75) Inventors: Ekarat T Mongkolsmai, Champaign, IL (US); Douglas R Armstrong, Champaign, IL (US); Sanjiv M Shah, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1512 days.

(21) Appl. No.: 11/026,687

(22) Filed: Dec. 30, 2004

(65) Prior Publication Data

US 2006/0150162 A1    Jul. 6, 2006

(51) Int. Cl.
*G06F 9/46* (2006.01)
(52) U.S. Cl. ..................................... 718/100
(58) Field of Classification Search .................. 718/100
See application file for complete search history.

(56) References Cited

U.S. PATENT DOCUMENTS

| | | | |
|---|---|---|---|
| 6,477,165 B1 * | 11/2002 | Kosco | 370/389 |
| 6,625,654 B1 * | 9/2003 | Wolrich et al. | 709/230 |
| 6,785,768 B2 * | 8/2004 | Peters et al. | 711/112 |
| 6,901,582 B1 * | 5/2005 | Harrison | 717/127 |
| 6,993,453 B2 * | 1/2006 | Krissell | 702/182 |
| 7,140,022 B2 * | 11/2006 | Binns | 718/105 |
| 7,266,726 B1 * | 9/2007 | Ladd et al. | 714/27 |
| 7,269,824 B2 * | 9/2007 | Noy et al. | 717/127 |
| 7,415,699 B2 * | 8/2008 | Gouriou et al. | 717/127 |

\* cited by examiner

*Primary Examiner*—Meng-Ai An
*Assistant Examiner*—Gregory A Kessler
(74) *Attorney, Agent, or Firm*—Blakely, Sokoloff, Taylor & Zafman LLP

(57) ABSTRACT

A method and apparatus for adaptive and dynamic filtering of threaded programs. An embodiment of a method comprises analyzing the operation of a computer program, the computer program comprising a plurality of program threads; tracking overhead for the computer program; observing program events for the computer program; rationing overhead between program threads in inter-thread program events; and filtering program events based on a dynamic threshold.

14 Claims, 6 Drawing Sheets

ADAPTIVE AND DYNAMIC FILTERING OF THREADED PROGRAMS

FIELD

An embodiment of the invention relates to system performance analysis in general, and more specifically to adaptive and dynamic filtering of threaded programs.

BACKGROUND

Computer programs are often subject to analysis in order to make determinations regarding program performance. For example, an instrumented program is a program that includes additional code added to the original program to gather statistical and behavioral information regarding the program. In a performance analysis tool that tracks the timing of events in the computer system, this instrumentation adds overhead that may affect the gathered data. In a multithreaded analysis tool, the additional overhead may change which program events actually occur in the program and may alter the relative ordering of program events.

A cross-thread event is a program event involving a first program thread that provides a signal to a second thread, with the second thread being required to wait for the signal. The timing variations that are introduced by instrumentation can cause cross-thread events to become non-cross-thread events, and vice versa. Additional overhead may potentially serialize or dramatically increase the runtime for the program.

However, conventional performance analysis tools utilized with multithreading applications generally do not take into account that the tool itself may be changing the program behavior. Because of the unintended changes in program operation, conventional tools do not provide a sufficiently accurate portrayal of the original program execution flow. For example, conventional performance analysis tools merely report how much overhead a thread has experienced within its own execution and do not take into account how cross-thread events may effect the amount of overhead a thread has experienced due to thread interaction. Further, such tools do not allow a user to establish the amount of acceptable overhead or to adjust analysis in response to system performance.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1A:
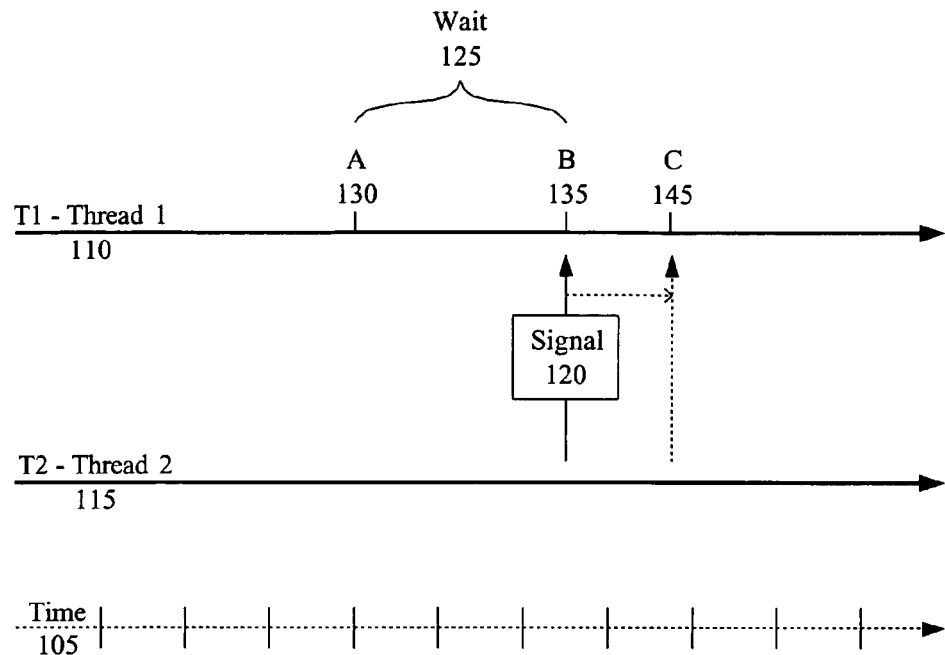
FIG. 1a is an illustration of rationing of overhead for a cross-thread event in an embodiment of the invention.

A method and apparatus are described for adaptive and dynamic filtering for analysis of threaded programs.

For the purposes of this description:

"Cross-thread event" means a program event in which a program thread waits before receiving a signal from another program thread.

"Overhead" means slowdown for a computer program. Overhead includes slowdown for individual threads caused by a profiling system.

In an embodiment of the invention, adaptive and dynamic filtering is provided for analysis of threaded programs. In one embodiment, a performance analysis tool includes filtering of program events.

In an embodiment of the invention, overhead incurred by a performance analysis system is maintained at an acceptable level, thereby maintaining an instrumented program's overall runtime slowdown at an acceptable level. In an embodiment of the invention, an attempt is made to match the accuracy of statistics for a profiled program's synchronization behavior with the original program's statistics. In one embodiment, slowdown of a program is limited by filtering synchronization events.

In one embodiment of the invention, a performance analyzer includes an adaptive filter to control the overhead resulting from the performance analyzer. In an embodiment, the performance analyzer determines how overhead should be rationed when inter-thread events such as cross-thread events occur. In an embodiment of the invention, a system includes an adaptive filter mechanism that ignores cross-thread events that occur when a multithreaded application profile disturbs the relative order of events such that a non-cross-thread event becomes a cross-thread event.

In one embodiment of the invention, a performance analyzer includes a dynamic filter to manage the overhead resulting from the performance analyzer. In an embodiment, the performance tool may adjust a monitoring threshold and thus modify program overhead ratio and the number of events that are observed. In one embodiment, a performance analyzer filters events to limit the total amount of overhead incurred. For example, less significant data may be ignored in order to keep measurement overhead within acceptable levels and thus to gather more accurate statistics. In an embodiment, a system includes a dynamic threshold filter mechanism to ignore certain events based on the amount of runtime slowdown a user running the application is willing to accept and the amount of data that the user wishes the analyzer to capture.

An embodiment of the invention tracks overhead for each thread in an instrumented program, including overhead that a thread experiences through interaction with another thread. An embodiment of a program analysis tool may allow increased accuracy in analysis of a multithreaded program because the tool does not ignore the overhead from program instrumentation or how the overhead changes the flow of execution in the program. An embodiment allows a user to control the amount of overhead the user is willing to tolerate while still capturing the most significant event data through the run of a program.

In an embodiment of the invention, an analysis tool, such as a thread profiler that analyzes operation of a multithreaded program, includes an adaptive filter mechanism or process.

The adaptive filter directs that each thread keep track of the amount of overhead time that is incurred because of program instrumentation. In an embodiment of the invention, overhead for each program thread may be tracked as follows:

(1) Timers may be used to track how long each instrumented thread spends within the analysis library; and (2) Instrumentation overhead is accurately tracked for each thread and each thread's overhead is adjusted based on interactions with other threads.

An embodiment of the invention may provide a more accurate measure of how much overhead the instrumentation of an application creates for each thread, as well as a more accurate picture of which events would have occurred without the instrumentation effects. If accurate overhead tracking for each thread is available, it is possible to track which cross-thread events may or may not have occurred in the original system.

In one embodiment of the invention, the tracking cross-thread events includes storing the value of a program thread's overhead before a wait occurs, and then checking how much overhead the thread has experienced after the wait operation. In one embodiment of the invention, when a first thread is required to wait for signal from a second thread (the inter-thread event thus being a cross-thread event), overhead that the second thread has experienced may be taken into account for the first thread's overhead value. In one embodiment, overhead is rationed as follows:

(1) If the overhead of the second thread minus the overhead of the first thread is greater than the wait time, then the wait operation would likely not have been observed in the original program as it would be uncontended (the signal would have occurred before the wait operation). In one embodiment, because the wait likely would not have occurred, the entire wait time is added to the overhead of the first thread. In another embodiment, events that likely would not have occurred in the original program are ignored and the wait time is not tracked.

(2) If the overhead of the second thread minus the overhead of the first thread is not greater than the wait time, then the cross-thread event likely would have occurred in the original program (the program without instrumentation). A determination is made whether the difference of the overhead of the second thread minus the overhead of the first thread is greater than zero, and the overhead is rationed as follows: (a) If the difference is greater than zero, then wait period has likely increased from what would have occurred in the original program, and the difference is added to the overhead of the first thread. (b) If the difference is not greater than zero, and then it is likely that the wait time in the original program would have been longer, and the overhead of the threads is not modified.

FIG. 1a is an illustration of rationing of overhead for a cross-thread event in an embodiment of the invention. In this example, the operation of a first program thread (T1) 110 and a second program thread (T2) 115 are shown against time 105. T1 110 begins waiting at time A 130 for a signal from T2 115. A signal 120 is sent from T2 115 and arrives at time B 135. As a result, T1 110 would wait for a wait period 125 that is equal to B−A. However, profiling and analysis of the program can affect this event. In an embodiment of the invention, if thread T2 115 has some overhead, there would be a delay in T2 115 sending the message and T1 110 would need to wait a slightly longer time, such as until a later time C 145 to receive the message 120. In an embodiment of the invention, because this extra bit of time would not have been present in the original execution of the program, then the extra time is added to the overhead of T1 110.

Figure 1B:
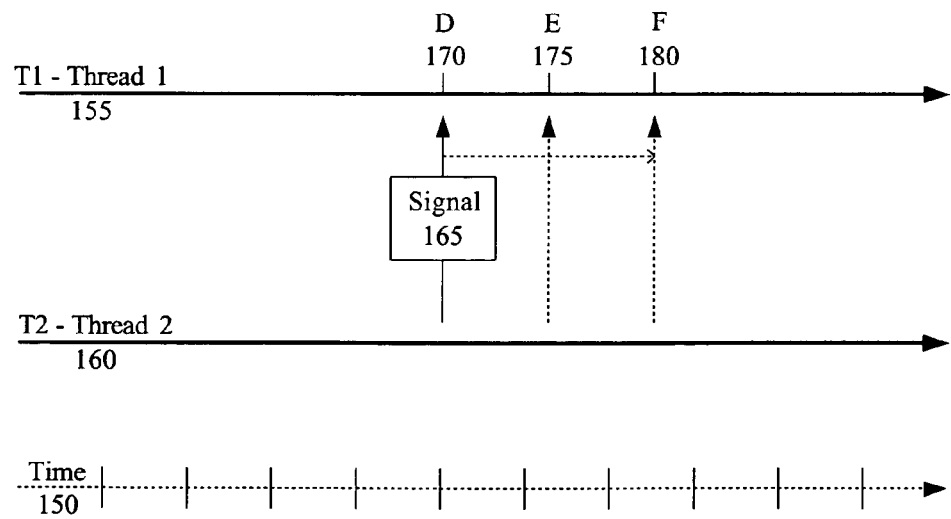
FIG. 1b is an illustration of rationing of overhead for a non-cross-thread event in an embodiment of the invention.

FIG. 1b is an illustration of rationing of overhead for a non-cross-thread event in an embodiment of the invention. In this illustration, a first program thread (T1) 155 and a second program thread (T2) 160 are again shown against time 150. A signal 165 is again sent from T2 160 to T1 155. However, T1 155 begins waiting for the message at a time D 170, and the message 165 also arrives at time D 170, and thus there is no wait period and the event should be non-cross-threaded. However, overhead can change this result. For example, if T2 160 has more overhead than T1 155, then T1 155 may start waiting at time E 175 while the signal 165 may not arrive until time F 180 and a wait will occur, transforming a non-cross-thread event into a cross-thread event. In an embodiment of the invention, the wait time is added to the overhead of thread T1 155. In one embodiment of the invention, it may be determined that the event would not have occurred without the program analysis and thus the event is ignored. In another example, T1 155 may have more overhead than T2 160. In this case, the point at which thread T1 155 would begin waiting may be delayed to time E 175 while the signal 165 arrives at time D 170, which would have no effect on waiting by T1 155 since the signal 165 arrives before waiting would begin. In an embodiment of the invention, no overhead is added to T1 155 because the operation of this thread is not affected by the any overhead of T2 160.

Figure 2:
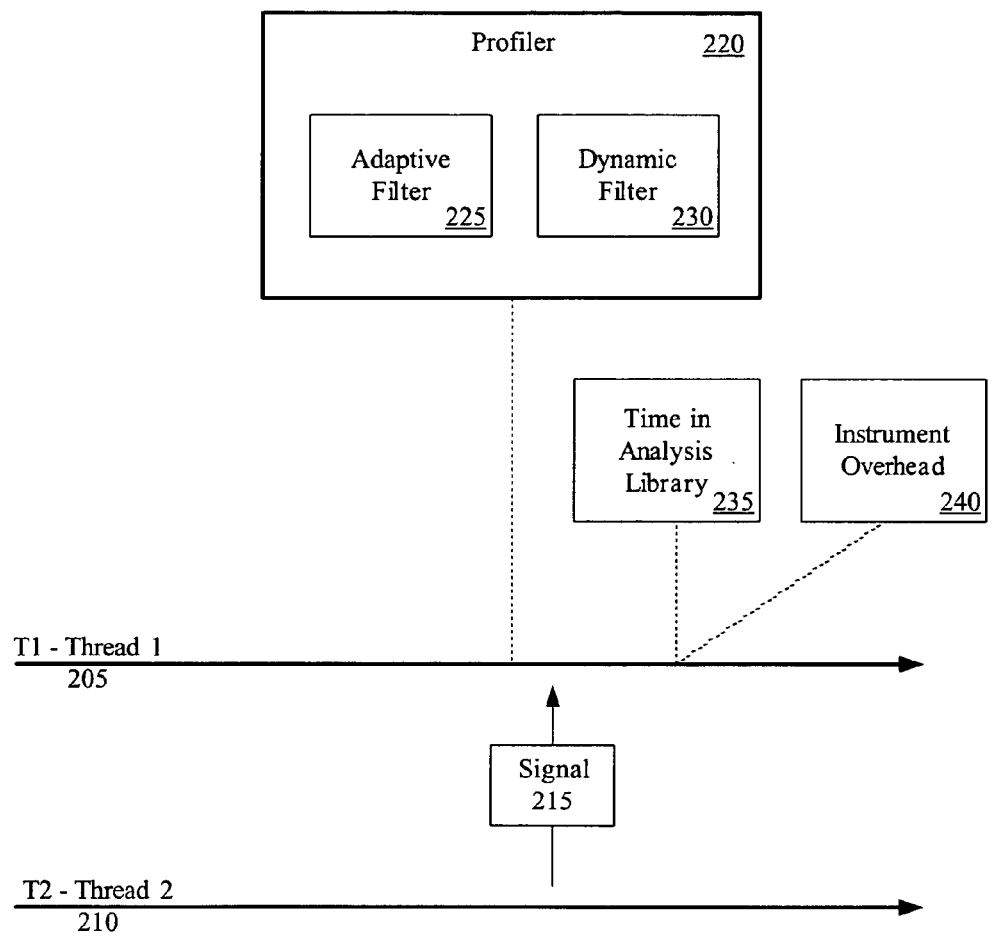
FIG. 2 is an illustration of an analysis tool under an embodiment of the invention.

FIG. 2 is an illustration of an analysis tool under an embodiment of the invention. In this illustration, a first program thread (T1) 205 and a second program thread (T2) 210 are shown. T1 205 receives a signal 215 from T2 210. The message event may or may not be a cross-thread event. An analysis tool in the form of a thread profiler 220 analyzes the operation of the program threads. The profiler 220 may be a part of an instrumented application. The profiler 220 may add overhead to T1 205 and T2 210 and thus affect the nature and timing of the passing of the signal 215 between the threads.

In an embodiment of the invention, the profiler 220 has certain components, the components including an adaptive filter 225 and a dynamic filter 230. In one embodiment, the adaptive filter 225 allows the profiler to determine the rationing of overhead between T1 205 and T2 210. In one embodiment, the dynamic filter 230 allows the profiler to modify the collection of data based on performance of the program. In one embodiment, data is recorded locally regarding the time each thread spends in the analysis library of the profiler 220 and the instrumentation count for a given type of API (application program interface) in the thread. In one embodiment, the collected data is utilized in filtering collected performance data. In an embodiment of the invention, because overhead measurements are kept locally on a per thread basis, there is minimal performance cost associated with adding the overhead tracking mechanism. In one embodiment of the invention, cross-thread events that would not have occurred without instrumentation are not tracked. By not tracking cross-thread events that would not have occurred without instrumentation, the amount of memory storage and the amount of overhead associated with tracking program events is reduced.

Figure 3:
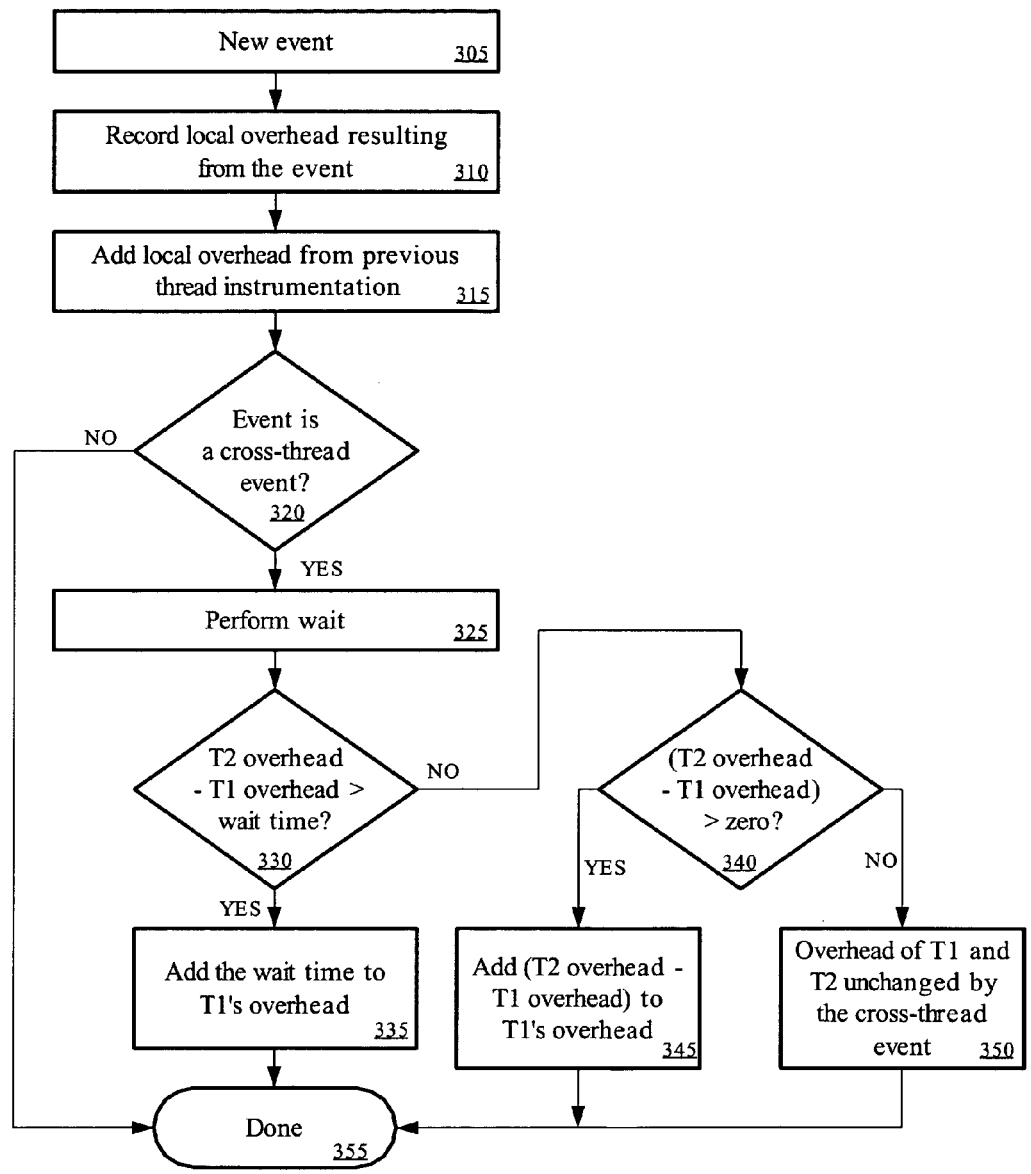
FIG. 3 illustrates adaptive filtering in an embodiment of the invention.

FIG. 3 illustrates adaptive filtering in an embodiment of the invention. In this illustration, a new event occurs 305. In this example, the event involves the transfer of a signal between threads, with a first thread (T1) receiving a signal from a second thread (T2). The event may or may not be cross-threaded. In addition, performance analysis utilizing thread instrumentation may add overhead to the operation of the threads, which may change the nature of the event. The local overhead for this event is recorded 310 and the local overhead from the previous thread instrumentation is added 315. However, there is a question whether overhead of the sending thread T2 should be added to the overhead of the receiving thread T1. If there is no cross-thread event 320, then no waiting time has been added to T1 and the process is completed 350.

However, if a cross-thread event has occurred, and thus T1 has had to wait for the arrival of a signal from T2, then there is question regarding how the overhead should be rationed. The wait for the signal is performed 325 and there is a determination whether the difference of the T2 overhead minus the T1 overhead is greater than the wait time 330. In one embodiment, if the difference is greater than the wait time (thus indicating that that the cross-thread event likely would not have occurred in the original program), then the wait time is added to the T1 overhead 335 and the process is completed 350. In another embodiment, the event may be ignored because it likely would not have occurred without the profiler performing instrumentation and analysis of the original program. If the difference is less than the wait time (thus indicating that the cross-thread event likely would have occurred in the original program), then there is a determination whether the T2 overhead minus the T1 overhead is greater than zero 340. If the T2 overhead minus the T1 overhead is greater than zero, then a value of the T2 overhead minus the T1 overhead is added to the T1 overhead 335. If the T2 overhead minus the T1 overhead is not greater than zero, then the wait time would have been even longer in the original program and the overhead of both threads is unchanged by the cross threaded event 345, and the process is completed 350.

In an embodiment of the invention, if accurate overhead tracking for each thread in a multithreaded program is available, it is possible to record a more accurate measurement for the amount of time a wait would have cost for each event. In one embodiment, a time value threshold may be set, with less significant cross-thread events that fall under the threshold being filtered out and ignored. The process of ignoring events below the threshold may be used to maintain an acceptable ratio to overhead time versus user time, while still attempting to collect sufficient data. In one embodiment, the threshold is dynamic with respect to time such that a desired ratio of overhead may be maintained or a desired percentage of data may be observed. In an embodiment, a user may specify certain parameters for dynamic filtering, such as a desired acceptable ratio of overhead time to user time, a worst-case ratio of overhead time to user time, and a desired minimal percentage of data to capture. In an embodiment of the invention, rather than, for example, controlling overhead of a run-time profiling system by ignoring events with a wait time below a static time threshold, a system provides a mechanism for dynamic adjustments to a threshold to provide both reasonable performance overhead and the capture of significant data.

Under an embodiment of the invention, a dynamic algorithm functions over a particular time interval. The time interval will vary with the particular embodiment. In one embodiment, the time interval may include a minimum sum of overhead time and a minimum number of events observed. In one possible example, a thread profiler may define a time interval as including at least 1 millisecond of overhead and 500 events. For each time interval, the algorithm tracks the ratio of overhead time to user time as well as the total overhead time and number of events seen. At the end of the interval, the algorithm will examine the overhead time to user time ratio and the percentage of events that are observed, and will adjust the time value threshold as necessary based at least in part on such elements.

In one embodiment of the invention, an algorithm for dynamic filtering may be as follows:

```
if ( overhead ratio > worst-case ratio ) then:
    increase the dynamic time threshold to an amount that should filter
        out a greater percentage of the data in an attempt to reduce
        the overhead ratio to the worst case ratio;
else if ( data captured < minimum percentage of data desired to be
        captured ) then:
    decrease the dynamic time threshold to an amount that should filter
        out a smaller percentage of the data in an attempt to capture
        more data to the desired amount of data;
else if ( overhead ratio > desired acceptable overhead ratio ) then:
    increase the dynamic time threshold in an attempt to filter out more
        data and reduce the amount of overhead to the acceptable
        overhead ratio;
else:
    decrease the dynamic time threshold in an attempt to gather more
        data while still remaining below the acceptable overhead
        ratio.
```

Figure 4:
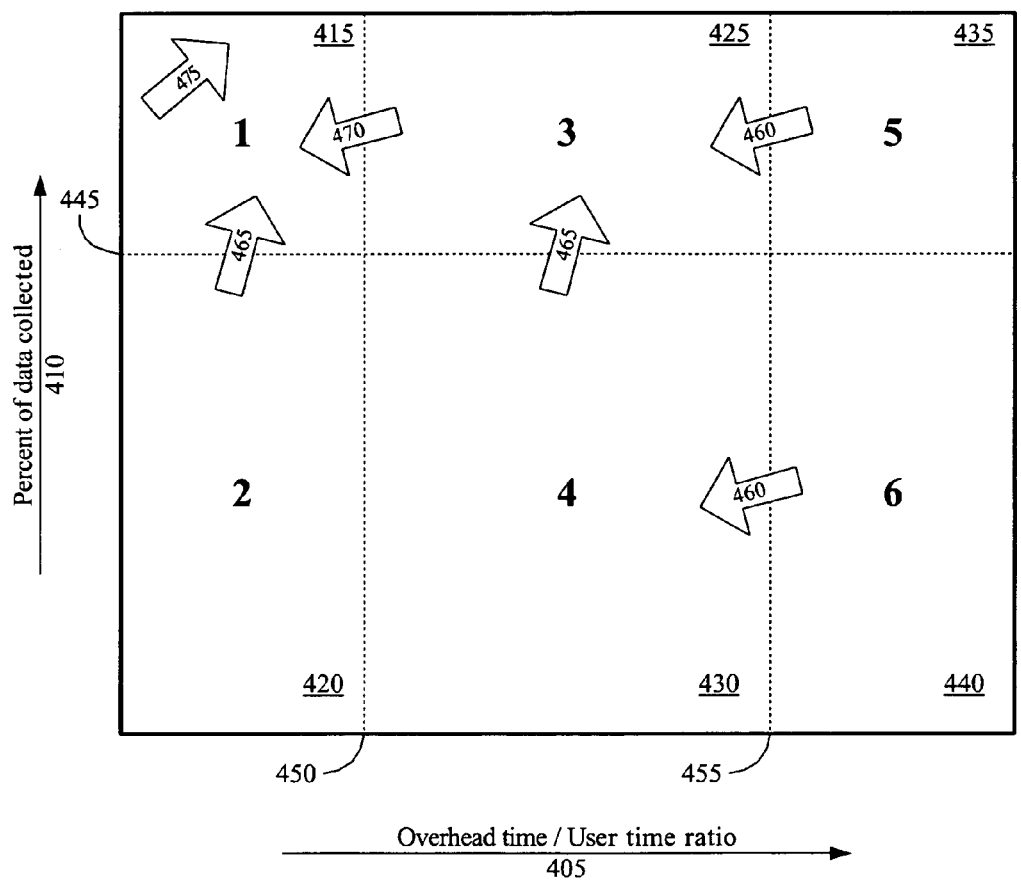
FIG. 4 is a graph to illustrate dynamic modification of data collection in an embodiment of the invention.

FIG. 4 is a graph to illustrate an embodiment of dynamic filtering of data. FIG. 4 illustrates the current state of a thread profiler as a function of the ratio between overhead time and user time 405, and the percentage of data that is collected 410. For the overhead/user ratio 405, lines are shown to indicate an acceptable overhead level 450 and a worst-case overhead level 455. For the percentage of data collected 410, a line is shown to indicate acceptable percentage of data collected 445. The indicated levels thus divide the graph space into six regions, the regions being:

Region 1 415—Overhead ratio is below acceptable level 450 and the percentage of data collected is above acceptable data level 445 (best case);
   Region 2 420—Overhead ratio is below acceptable level 450, but percentage of data collected is below acceptable data level 445;
   Region 3 425—Overhead ratio is above the acceptable level 450 but below the worst-case level 455, with the percentage of data being above the acceptable data level 445;
   Region 4 430—Overhead ratio is above the acceptable level 450 but below the worst-case level 455, with the percentage of data collected being below the acceptable data level 445;
   Region 5 435—Overhead ratio is above the worst case level 455, with percentage of data collected being above the acceptable data level 445; and
   Region 6 440—Overhead ratio is above the worst-case level 455 and the percentage of data collected is below the acceptable data level 445 (worst case).

In a first example, an operation in Region 5 435 or Region 6 440 has too much overhead. In these cases, the dynamic filter may reduce the amount of data collected 460 in order to move towards Region 3 425 or Region 4 430.

In a second example, an operation in Region 2 420 or Region 4 430 has acceptable overhead but is collecting insufficient data. The dynamic filter allows an increase in the collection of data 465 in order to move towards Region 1 415 or Region 3 425.

In a third example, an operation in Region 3 425 is collecting enough data but overhead is greater than is desired. The dynamic filter may reduce the amount of data collected 470 in order to move towards Region 1 415. In Region 1 415 there is an acceptable amount of data being collected and the program is below the acceptable overhead threshold.

In a fourth example, with the operation in Region 1 415 it may be possible to gather more data at the cost of some overhead while still remaining in the region 475. The collection of more data may provide a more complete analysis of the program.

Figure 5:
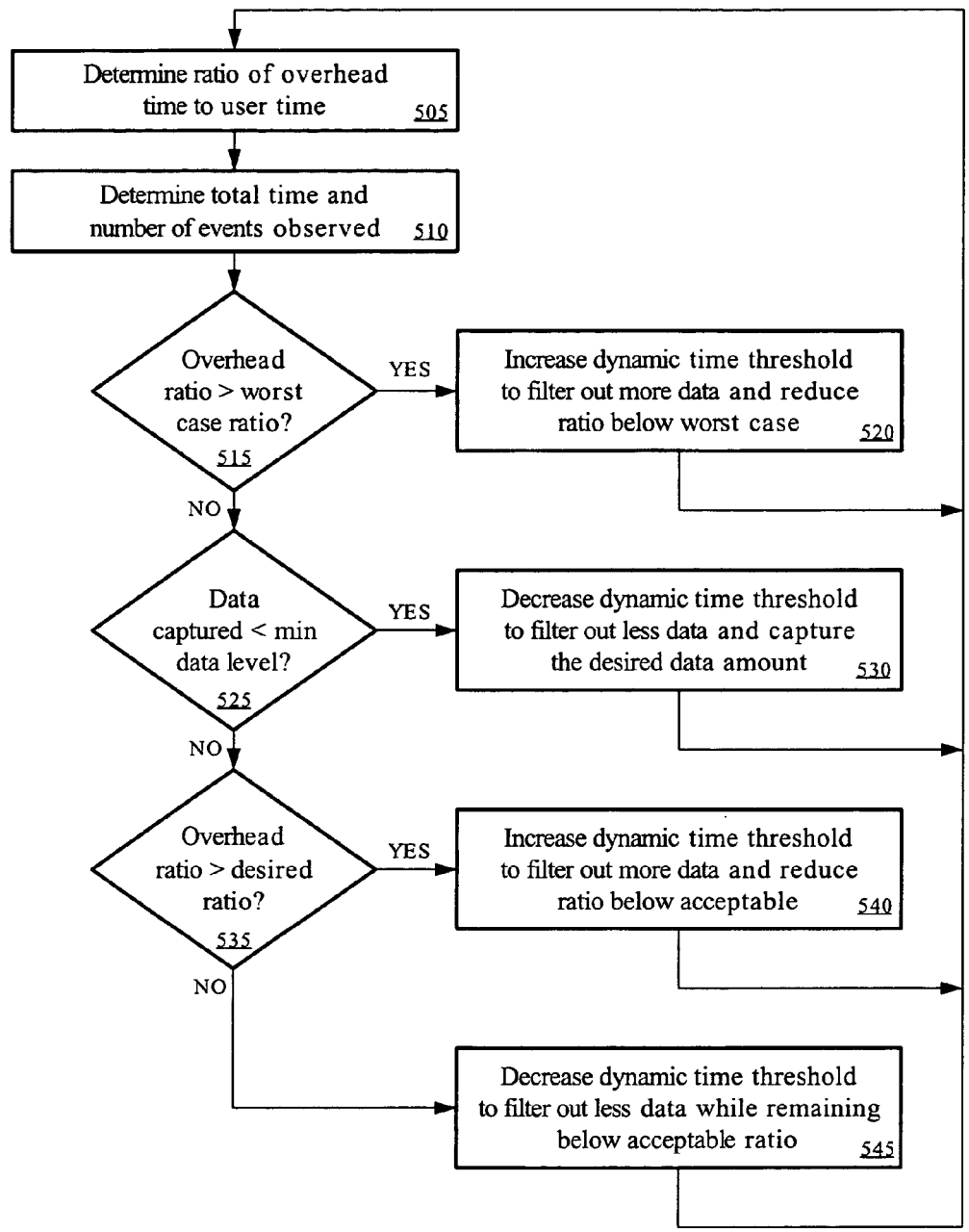
FIG. 5 is a flow chart to illustrate dynamic filtering of data in an embodiment of the invention.

FIG. 5 is a flow chart to illustrate dynamic filtering of data in an embodiment of the invention. In this illustration, an application is examined for a certain time interval. The ratio of overhead time to user time is determined for the time interval 505. In addition, the total time and number of events seen during the interval are determined 510.

If the overhead to user time ratio is greater than a worst-case ratio for the operation 515 (thus the current analysis state is in Region 5 435 or Region 6 440 in FIG. 4), then a dynamic time threshold is increased to filter out more data and thus to reduce the ratio below the worst-case ratio 520. Otherwise there is a determination whether the amount of data captured is less than the minimum data level for the operation 525. If so (indicating that the current analysis state is in Region 2 420 or Region 4 430 in FIG. 4), the dynamic time threshold is decreased to filter out less data and attempt to capture the desired amount of data 530. If not, there is determination whether the overhead to user time ratio is greater than a desired ratio level 535. If so (indicating that the current analysis state is in Region 3 425 in FIG. 4), the dynamic time threshold is increased to filter out more data and reduce the overhead ratio to below the acceptable level 540. If not (indicating that the current analysis state is in Region 1 415 in FIG. 4), then the dynamic time threshold is reduced to filter out less data while the overhead ratio remains below the acceptable ratio level 545. After the appropriate modification of the dynamic time threshold, the threshold is used for another time interval and the process continues with the determination of data for the interval 505 and 510.

In one embodiment of the invention, an algorithm may be used to determine how much to dynamically modify a threshold for filtering based on a requested amount of data to be filtered. In the embodiment, a system records the average wait time for a cross-thread event during a previous interval and the standard deviation of the wait times for the events of the previous interval. Assuming a "bell-curve" normal distribution (also commonly referred to as a Gaussian distribution), the system calculates an estimate of what time value is needed to result in the requested percentage of data captured for the next interval. In one example, if the percentage of data captured is 100%, but the overhead is twice the worst-case ratio, then it would be desirable to capture only 50% of the data. In an embodiment, this may be accomplished by calculating a time threshold using the percentage of data desired according to the following:

New Threshold=Average Wait Time+Standard Deviation*$F$(percentage of data desired)

where $F(x)$ is a table that maps the number of standard deviations required to get a desired percentage of data for a normal distribution. The table is commonly referred to as the "z-table".

Figure 6:
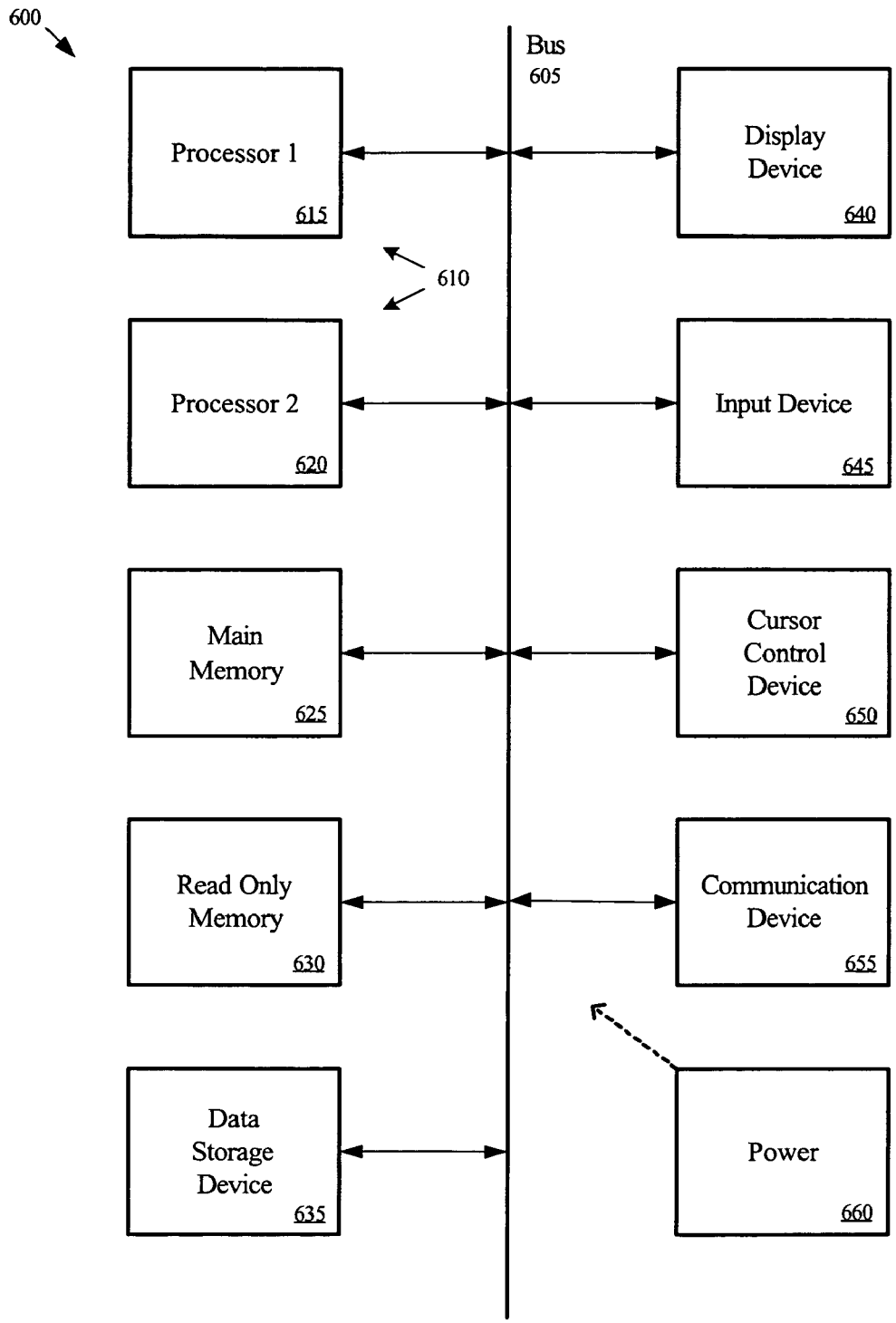
FIG. 6 is a block diagram of an embodiment of a computer system that may include filtering of data collected from a multithreaded program.

FIG. 6 is block diagram of an embodiment of a computer system that may provide that may include filtering of data collected from a multithreaded program. Under an embodiment of the invention, a computer 600 comprises a bus 605 or other communication means for communicating information, and a processing means such as two or more processors 610 (shown as a first processor 615 and a second processor 620) coupled with the first bus 605 for processing information. The processors 610 may comprise one or more physical processors and one or more logical processors. Under an embodiment of the invention, the processors 610 are capable of running multithreaded applications. In one embodiment, a multithreaded application includes instrumentation for evaluating the operation of the application.

The computer 600 further comprises a random access memory (RAM) or other dynamic storage device as a main memory 625 for storing information and instructions to be executed by the processors 610. Main memory 625 also may be used for storing temporary variables or other intermediate information during execution of instructions by the processors 610. In an embodiment of the invention, an instrumented application is loaded into main memory 625. The computer 600 also may comprise a read only memory (ROM) 630 and/or other static storage device for storing static information and instructions for the processors 610.

A data storage device 635 may also be coupled to the bus 605 of the computer 600 for storing information and instructions. The data storage device 635 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 640, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 640 may be or may include an audio device, such as a speaker for providing audio information. An input device 645 may be coupled to the bus 605 for communicating information and/or command selections to the processors 610. In various implementations, input device 645 may be a keyboard, a keypad, a touch-screen and stylus, a voice-activated system, or other input device, or combinations of such devices. Another type of user input device that may be included is a cursor control device 650, such as a mouse, a trackball, or cursor direction keys for communicating direction information and command selections to the one or more processors 610 and for controlling cursor movement on the display device 640.

A communication device 655 may also be coupled to the bus 605. Depending upon the particular implementation, the communication device 655 may include a transceiver, a wireless modem, a network interface card, or other interface device. The computer 600 may be linked to a network or to other devices using the communication device 655, which may include links to the Internet, a local area network, or another environment. The computer 600 may also comprise a power device or system 660, which may comprise a power supply, a battery, a solar cell, a fuel cell, or other system or device for providing or generating power. The power provided by the power device or system 660 may be distributed as required to elements of the computer 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
    analyzing by a performance analyzer the operation of a computer application, the computer application comprising a first program thread and a second program thread, the performance analyzer including an adaptive filter;
    recording overhead for the first program thread and the second program thread in a computer memory;
    observing an inter-thread event comprising the transfer of a signal from the second program thread to the first program thread; and
    adjusting the overhead for the first program thread using the adaptive filter if the first program thread waits a time period before receiving the signal from the second program thread, wherein adjusting the overhead for the first program thread includes:
        determining whether the overhead of the second program thread minus the overhead of the first program thread is greater than the wait time period, and
        upon determining that the overhead of the second program thread minus the overhead of the first program thread is greater than the wait time period, performing one of adding the wait time period to the overhead of the first program thread or ignoring the wait time period of the inter-thread event.

2. The method of claim 1, further comprising adding the overhead of the second program thread minus the overhead of the first program thread to the overhead of the first program thread if the overhead of the second program thread minus the overhead of the first program thread is not greater than the wait time period but is greater than zero.

3. The method of claim 1, further comprising making no change to the overhead of the first program thread if the overhead of the second program thread minus the overhead of the first program thread is not greater than zero.

4. The method of claim 1, further comprising establishing a threshold for analysis using a dynamic filter of the performance analyzer, wherein a second inter-thread event is not observed if the overhead resulting from the second inter-thread event is below the threshold.

5. A performance analyzer system comprising:
    a dynamic memory to store a multithreaded program, the program comprising a first program thread and a second program threat
    a processor to run the multithreaded program; and
    a performance analyzer including:
        an adaptive filter for the multithreaded program, the adaptive filter to determine the rationing of overhead between a plurality of program threads in inter-thread events, wherein the adaptive filter is to determine whether an inter-thread event between a first program thread and a second program thread, the first program thread waiting a time period before receiving a signal from the second program thread, may have occurred without the operation of the performance analyzer by determining whether the overhead of the second program thread minus the overhead of the first program thread is greater than the wait time period; and
        a dynamic filter for the multithreaded program, the dynamic filter to modify a threshold for collection of data based on the performance of the program.

6. The performance analyzer system of claim 5, wherein the dynamic filter is to adjust the threshold based at least in part on a percentage of inter-thread events that are observed by the analyzer.

7. The performance analyzer system of claim 5, wherein the dynamic filter is to adjust the threshold based at least in part on a ratio of overhead time for the thread versus user time for the program.

8. A system comprising:
    a dynamic memory to store a multithreaded program, the program comprising a first program thread and a second program thread;
    a processor to run the multithreaded program; and
    an analysis tool to analyze the performance of the multithreaded program as run by the processor, the analysis tool comprising a first component to track overhead for program threads and a second component to determine which cross-thread events are to be observed by the analysis tool;

wherein the first component determines the rationing of overhead time between the first program thread and the second program thread in a cross-thread event comprising the second program thread sending a signal to the first program thread, the first component determining an overhead element to ration to the first program thread if the first program thread waits for a time period before receiving the signal from the second program thread, the overhead element rationed to the first program thread being equal to the waiting period if the difference between the overhead of the second thread and the overhead of the first thread is greater than the length of the waiting time period.

9. The system of claim 8, wherein the overhead element rationed to the first program thread is the difference between the overhead of the second thread and the overhead of the first thread if the difference between the overhead of the second thread and the overhead of the first thread is not greater than the length of the waiting time period but is greater than zero.

10. The system of claim 8, wherein the overhead element rationed to the first program thread is zero if the difference between the overhead of the second thread and the overhead of the first thread is not greater than zero.

11. The system of claim 8, wherein the second component utilizes a threshold to determine which program cross-thread events are to be observed by the analysis tool.

12. The system of claim 11, wherein the second component dynamically changes the threshold based at least in part on the amount of overhead time incurred.

13. The system of claim 11, wherein the second component dynamically changes the threshold based at least in part on the number of cross-thread events observed.

14. A machine-readable medium having stored thereon data representing sequences of instructions that, when executed by a processor, cause the processor to perform operations comprising:
  analyzing the operation of a computer program, the computer program comprising a plurality of program threads;
  tracking overhead for the computer program;
  observing inter-thread events for the computer program;
  rationing overhead between program threads in inter-thread inter-thread events, wherein rationing overhead includes:
    observing a first inter-thread event comprising the transfer of a signal from a second program thread to a first program thread; and
    adjusting the overhead for the first program thread if the first program thread waits a time period before receiving the signal from the second program thread, wherein adjusting the overhead for the first program thread includes:
      determining whether the overhead of the second program thread minus the overhead of the first program thread is greater than the wait time period, and
      upon determining that the overhead of the second program thread minus the overhead of the first program thread is greater than the wait time period, performing one of adding the wait time period to the overhead of the first program thread or ignoring the wait time period of the inter-thread event; and
  filtering program events based on a dynamic threshold.

* * * * *

UNITED STATES PATENT AND TRADEMARK OFFICE
CERTIFICATE OF CORRECTION

PATENT NO. : 7,703,094 B2
APPLICATION NO. : 11/026687
DATED : April 20, 2010
INVENTOR(S) : Mongkolsmai et al.

Page 1 of 1

It is certified that error appears in the above-identified patent and that said Letters Patent is hereby corrected as shown below:

In column 10, at line 31, delete, "threat" and insert --thread;--.

In column 11, at line 25, after, --which-- delete "program".

Signed and Sealed this
First Day of March, 2011

David J. Kappos
*Director of the United States Patent and Trademark Office*